United States Patent Office 2,857,420
Patented Oct. 21, 1958

2,857,420

DERIVATIVES OF β-HYDROXY-β-METHYL-γ-FORMYLBUTYRIC ACID

Carl H. Hoffman, Scotch Plains, and Donald E. Wolf, Princeton, N. J., assignors to Merck & Co., Inc., Rahway, N. J., a corporation of New Jersey No Drawing. Application September 21, 1956
Serial No. 611,384

5 Claims. (Cl. 260—483)

This invention relates to β-hydroxy-β-methyl-γ-formylbutyric acid, esters and acetals of this acid and to certain related compounds which are further reduced analogs of this acid. These related compounds are the hydroxy-aldehyde, β,δ-dihydroxy-β-methylvaleraldehyde, as well as its acetals, and the triol, 1,3,5-trihydroxy-3-methylpentane. The invention also includes the processes for preparation of these compounds.

The above acid is an analog of β-hydroxy-β-methyl-δ-valerolactone and the corresponding acid, 3-methyl-3,5-dihydroxypentanoic acid which are disclosed and claimed in our copending application Serial No. 597,329, filed on June 12, 1956. The compounds of the present invention have the same utility of our aforementioned application in that they are useful in minute quantities for promoting the growth of *Lactobacillus acidophilus* ATCC 4963 and other related lactobacilli which are employed in the production of lactic acid and cottage cheese.

The aldehyde-acid may be prepared by controlled partial reduction of diethyl (or any lower alkyl) β-hydroxy-β-methyl glutarate with lithium aluminum hydride. Although the resulting ester may be hydrolyzed directly to obtain the aldehyde-acid, the preferred procedure is to form an acetal with the terminal aldehyde group, forming a lower dialkoxy compound (acetal) of such lower alkyl ester of β-hydroxy-β-methyl-γ-formylbutyric acid, then hydrolyze the ester group with dilute alkali to yield an acetal, followed by dilute acid hydrolysis of the terminal dialkoxy grouping to yield the aldehyde-acid, β-hydroxy-β-methyl-γ-formylbutyric acid.

The related aldehyde-alcohol, β,δ-dihydroxy-β-methyl-valeraldehyde, is preferably prepared by partial selective reduction of the lactone, β-methyl-β-hydroxy-δ-valerolactone disclosed in Serial No. 597,329.

The related triol, 1,3,5-trihydroxy-3-methylpentane, may be conveniently prepared by complete reduction of either β-methyl-β-hydroxy-δ-valerolactone, or of diethyl (or any other lower alkyl) β-hydroxy-β-methyl glutarate, using lithium aluminum hydride in excess. Where other lower alkyl esters are referred to above, those resulting from alcohols having from one to six carbon atoms are intended.

The invention will be further clarified by reference to the following illustrative examples.

EXAMPLE 1

*Reduction of diethyl β-hydroxy-β-methylglutarate to ethyl β-hydroxy-β-methyl-γ-formyl butyrate and hydrolysis of the latter to β-hydroxy-β-methyl-γ-formylbutyric acid*

A solution of 4.4 g. (20 millimoles) of diethyl β-hydroxy-β-methyl glutarate in 100 ml. of dry, peroxide-free tetrahydrofuran is made in a 250 ml. three-necked flask equipped with sealed stirrer, low range thermometer, addition (dropping) funnel, and soda-lime tube closures to protect the reactants from moisture. The apparatus, previous to loading, is dried by distillation of about 100 ml. of benzene out of the ports. (Suitable tetrahydrofuran is best made by distilling the reagent grade from a large excess of lithium aluminum hydride after standing for a day or more protected from moisture.)

A solution of lithium aluminum hydride in ether is previously prepared by dissolving 4.4 g. of the commercial material in 200 ml. of ether (anhydrous and alcohol free, stored over sodium wire before use) by refluxing about 10 hours and allowing the undesirable sludge to settle over night. This supernatant solution is approximately 0.5 M in active reducing reagent.

A mixture is made of 18 ml. (containing approximately 8–9 millimoles of active hydride) of the above ether solution with about 20 ml. of the pure dry tetrahydrofuran in the addition funnel in the reaction apparatus. The reaction solution of the diester is stirred rapidly, and cooled (by means of a Dry Ice bath) to an inside temperature of $-40 \pm 10°$ C. and the hydride solution is added dropwise over a period of about ½ hour. After stirring an additional half hour, the mixture is allowed to warm to room temperature and about 5 ml. of water is cautiously added dropwise with very rapid stirring. After stirring for about one hour, the mixture is filtered and the filtrate is concentrated to an oily residue weighing 4 g. which contains the ethyl ester of β-hydroxy-β-methyl-γ-formyl butyrate. The oil gives a distinct test with Schiff reagent and reduces Fehling's and Tollens' reagents.

This aldehyde-ester may be directly hydrolyzed with dilute alkali, but it is preferable to protect the aldehyde group by the following procedure:

Three and one-tenth grams of the oily aldehyde-ester obtained above is dissolved in 50 ml. of pure formaldehyde diethylacetal and the solution is treated with about 0.1–0.2 g. of dry hydrogen chloride gas. After standing overnight, the solution contains the diethyl acetal of ethyl β-hydroxy-β-methyl-γ-formyl butyrate. Sufficient ethanol solution of sodium ethoxide (approx. 1 M, in ethanol) is added, rapidly with rapid stirring, to completely neutralize the acidity and leave the solution very slightly alkaline (test with litmus paper) and about 10 ml. of water is added. The solvents and excess formaldehyde diethylacetal are removed by concentration under vacuum without heating to a moist residue containing salts and the oily diethyl acetal of ethyl β-hydroxy-β-methyl-γ-formyl butyrate.

Although formaldehyde diethylacetal has been used to obtain the acetal of the aldehyde group, the invention contemplates the conversion of the aldehyde to acetals of other lower alkyl radicals having one to six carbon atoms.

The sodium salt of the aldehyde-acid is formed by dissolving the residue in about 50 ml. of ethanol and 50 ml. of water containing 2 g. of sodium hydroxide. The solution is allowed to stand overnight at room temperature, after which hydrolysis is complete and the acid is present as the sodium salt of the diethyl acetal of β-hydroxy-β-methyl-γ-formylbutyric acid in solution.

The free aldehyde-acid is prepared directly by acidification of the solution with dilute hydrochloric acid (2 N, added by burette to stoichiometric equivalence; 25.0 ml. is required) in excess; 50 ml. is added and the solution is concentrated to about one-half its former volume and allowed to stand under slightly acidic conditions overnight. The solution is then concentrated under high vacuum (<1 mm.) without heating to remove all solvents and excess hydrochloric acid, leaving a residue of salts and the free aldehyde-acid. This residue is extracted three times with 30 ml. of chloroform and the chloroform solution is dried over sodium sulfate, filtered, and the filtrate is concentrated free of solvent leaving a residue of oily β-hydroxy-β-methyl-γ-formylbutyric acid. The product reduces Tollens' and Fehling's solution and gives an orange precipitate with Brady's reagent (2,4-dinitrophenylhydrazine).

The diethyl ester of the starting glutarate has been used for convenience, but the diester of any alcohol having from one to six carbon atoms may be used as well. They may be used in the same manner and therefore their specific exemplification is not necessary. The free aldehyde-acid may be converted to any desired alkaline or alkaline-earth salt by conventional procedures.

EXAMPLE 2

*Reduction of β-hydroxy-β-methyl-δ-valerolactone to β,δ-dihydroxy-β-methyl valeraldehyde by lithium aluminum hydride*

A stock solution of lithium aluminum hydride is prepared as in Example 1.

A three-necked round-bottom flask, equipped with a sealed stirrer, addition funnel, and inside thermometer, with soda-lime tubes protecting the closures, is dried thoroughly by distillation of about 50 ml. of benzene from the ports and evaporation of the remaining by vacuum, and cooling.

In this apparatus, a solution of 1.06 g. of pure, freshly distilled β-hydroxy-β-methyl-δ-valerolactone is made in 100 ml. of dry, pure tetrahydrofuran (freshly distilled from excess lithium aluminum hydride).

A mixture of 9 ml. of the stock ether solution of lithium aluminum hydride and 15 ml. of pure tetrahydrofuran is made in the addition funnel.

The solution of lactone is stirred rapidly, cooled to −30 to −40° C. (by application of a Dry Ice bath) and the ether-tetrahydrofuran solution of hydride is added dropwise during about ten minutes. After stirring an additional ten minutes, the mixture is allowed to warm to room temperature, and 2.5 ml. of water is added dropwise with vigorous stirring which is continued for one-half hour. The mixture is then filtered, and the filtrate is concentrated under vacuum leaving an oily residue, weighing 932 mg., of β,δ-dihydroxy-β-methylvaleraldehyde. This oil does not give a Schiff test, but reduces Benedict's and Tollens' reagents slowly. A trial titration on 16 mg. of the oil in water shows that <0.1 ml. of N/10 sodium hydroxide is consumed (with phenolphthalein indicator) whereas the starting material (lactone) requires about 1.3 ml. for this amount. The compound probably exists predominantly in the cyclic form (2,4-dihydroxy-4-methyltetrahydropyran) and for this reason is slow to react with some typical aldehyde reagents. Heating the oily product with methanolic 2,4-dinitrophenylhydrazine and hydrochloric acid gives a red gummy precipitate; but allowing a solution of the oil and dinitrophenylhydrazine containing only a trace of hydrochloric acid to stand overnight yields orange needles, M. P. 185–186° C. dec., of the 2,4-dinitrophenylhydrazine of β,δ-dihydroxy-β-methylvaleraldehyde.

EXAMPLE 3

*Reduction of diethyl β-hydroxy-β-methyl glutarate to 1,3,5-trihydroxy-3-methylpentane with lithium aluminum hydride*

A solution of 4.4 g. of diethyl β-hydroxy-β-methyl glutarate in 100 ml. of dry tetrahydrofuran is placed in a 250 ml. three-necked flask (previously dried by the technique described in Example 1) equipped with a sealed stirrer, addition funnel, and soda-lime tube closures. The flask is cooled by an ice bath and 50 ml. of an ether solution of lithium aluminum hydride (containing about 50 millimoles of active reducing reagent; prepared by the technique of Example 1, except that about 4.4 g. of commercial hydride is refluxed with 100 ml. of ether) is added dropwise with rapid stirring during about one-quarter hour. The mixture is allowed to warm to room temperature and is stirred for an additional one-half hour, after which the ice bath is again applied and 10 ml. of ethyl acetate is added dropwise, and then 25 ml. of water is cautiously added. After stirring the resulting suspension for one-half hour, it is filtered and the filtrate is concentrated under vacuum until free of solvents leaving an oily residue of substantially pure 3-methyl-1,3,5-trihydroxypentane, weighing 2.6 g.

EXAMPLE 4

*Reduction of β-hydroxy-β-methyl-δ-valerolactone to 1,3,5-trihydroxy-3-methylpentane with lithium aluminum hydride*

A solution of 7.8 g. (0.06 mole) of β-hydroxy-β-methyl-δ-valerolactone is made in 50 ml. of dry tetrahydrofuran (purified by previously stated method). This solution is added during one-quarter hour to a slurry of 5 g. of powdered lithium aluminum hydride in 50 ml. of dry ether with rapid stirring in the usual apparatus, also equipped with a reflux condenser. A little cooling by means of an ice bath is required to prevent too rapid refluxing of the ether. After stirring at room temperature for one-half hour more, 30 ml. of ethyl acetate and then 65 ml. of water are cautiously added with stirring. The suspension is filtered, and the filtrate is concentrated under vacuum to an oily residue free of solvents, weighing 8 g., containing substantially pure 3-methyl-1,3,5-trihydroxypentane.

What is claimed is:

1. A compound selected from the group consisting of β-methyl-β-hydroxy-γ-formylbutyric acid, its alkali and alkaline-earth salts, its lower alkyl esters, and its lower dialkyl acetals.

2. β-Methyl-β-hydroxy-γ-formylbutyric acid.

3. Lower dialkyl acetals of β-methyl-β-hydroxy-γ-formylbutyric acid.

4. Lower alkyl esters of β-methyl-β-hydroxy-γ-formylbutyric acid.

5. The process of partially reducing a lower alkyl diester of β-hydroxy-β-methyl glutarate to convert it to a lower alkyl monoester of β-hydroxy-β-methyl-γ-formyl butyrate which comprises actively stirring together the compound to be reduced and lithium aluminum hydride in an inert solvent under substantially moisture-free conditions at a temperature below 0° C. and for a period of at least a half hour.

References Cited in the file of this patent

Beilstein, vol. I, 1st. supp. (1928), p. 277.
Bachmann et al.: J. Am. Chem. Soc., 71 (1949), pp. 3222–3.
Wacek et al.: Chem. Abstract, 44 (1950), 3899e.
Marvel et al.: J. Am. Chem. Soc., 73 (1951), 481.
Paul et al.: Chem. Abstract, 46 (1952), 6589.